Figure 1:
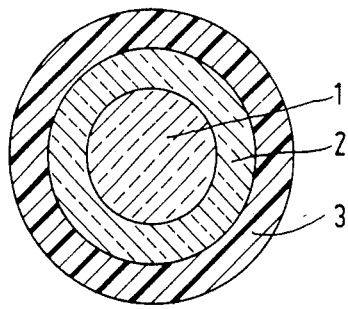

United States Patent [19]

Broer et al.

[11] Patent Number: 4,741,596
[45] Date of Patent: May 3, 1988

[54] OPTICAL GLASS FIBRE HAVING A SYNTHETIC RESIN COATING AND METHOD OF MANUFACTURING SAME

[75] Inventors: Dirk J. Broer; Grietje N. Mol, both of Eindhoven, Netherlands

[73] Assignee: U.S. Philips Corp., New York, N.Y.

[21] Appl. No.: 737,993

[22] Filed: May 28, 1985

[30] Foreign Application Priority Data

Jun. 22, 1984 [NL] Netherlands .................. 8401981

[51] Int. Cl.⁴ .................. B32B 9/00; C03C 25/02; G02B 6/00
[52] U.S. Cl. .................. 350/96.34; 65/3.11; 428/392
[58] Field of Search .............. 428/373, 374, 375, 394, 428/392; 350/96.30, 96.34, 96.33; 526/245; 65/3.11, 3.43; 427/163, 36, 54.1

[56] References Cited

U.S. PATENT DOCUMENTS

| | | | |
|---|---|---|---|
| 4,324,575 | 4/1982 | Levy | 427/36 X |
| 4,508,916 | 4/1985 | Newell et al. | 522/96 X |
| 4,629,287 | 12/1986 | Bishop | 350/96.34 |

Primary Examiner—Lorraine T. Kendell
Attorney, Agent, or Firm—Norman N. Spain

[57] ABSTRACT

The invention provides an optical glass fibre having a synthetic resin coating and a method of manufacturing same, the first layer of the synthetic resin coating being formed from a curable polyether urethane acrylate composition.

The glass transition temperature of the synthetic rubber formed after curing is reduced to −50° C. or lower by increasing the molecular weight of the polyether urethane acrylate and, if necessary, by using aromatic instead of aliphatic urethanes. During coating the viscosity is low due to the presence of monofunctional acrylates of low viscosity. The curable synthetic composition exhibits a high curing rate.

9 Claims, 1 Drawing Sheet

OPTICAL GLASS FIBRE HAVING A SYNTHETIC RESIN COATING AND METHOD OF MANUFACTURING SAME

The invention relates to an optical glass fibre having a synthetic resin coating comprising a synthetic rubber formed from a curable synthetic resin composition which comprises a mixture of an oligomeric urethane acrylate and a monomeric acrylate of low viscosity.

The invention also relates to a method of manufacturing an optical glass fibre having a synthetic resin coating in which, immediately after its formation the fibre is enveloped with a layer of a curable synthetic resin composition, which is cured by exposure to light or electrons.

Such an optical glass fibre and method for manufacturing same are described, amongst others, in U.S. Pat. No. 4,324,575. This method discloses the use of a curable synthetic resin composition comprising 40–90% by weight of an oligomeric resin, which is a condensation product of polypropylene glycol and two units of an O-hydroxyethyl acrylate-N-C-aliphatic urethane. The polypropylene glycol contains between 12 and 80 monomeric units. In addition, the curable synthetic resin composition comprises 5–45% by weight of a polyalkyl glycol dimethacrylate and may contain up to 15% by weight of a difunctional or trifunctional monomeric acrylate, i.e. compounds containing two or three acrylate-ester groups per molecule. The curable synthetic resin composition also comprises a photo-initiator and is made to cure by means of UV-radiation to form a synthetic rubber having a glass transition temperature of from $-40°$ to $+90°$ C. The curable synthetic resin composition does not comprise any solvents.

Curable synthetic resin compositions as described herein are used for applying a first, soft coating (modulus of elasticity of from 1 to 10 MPa) to a glass fibre for optical transmission purposes. Subsequently, a second, hard coating (modulus of elasticity exceeding 100 MPa) is applied, yielding a glass fibre having a large strength and a low susceptibility to microbending, so that transmission losses caused by mechanical deformation of the glass fibre are low.

It is the object of the invention to provide an optical glass fibre having a synthetic resin coating with a very low glass transition temperature, for example $-50°$ C. or lower. It is known per se that a low glass transition temperature can be obtained by applying an oligomeric urethane acrylate having a high molecular weight, but if no additional measures are taken, this will result in an undesirably low refractive index and an undesirably high viscosity of the curable synthetic resin composition. The refractive index of the synthetic resin coating should be higher than that of the outermost layer of the glass fibre. Suitably, the refractive index of the curable synthetic resin composition, in comparison with that of the glass fibre is so high as to allow the central position of the glass fibre in the synthetic resin coating to be checked visually. Further, care should be taken that the viscosity of the curable synthetic resin composition is not too high at the coating temperature, otherwise it would be impossible to form a smooth layer on the glass fibre at the desired high coating rate.

A further object of the invention is to provide a method, in which a glass fibre coating rate in excess of 5 m/s is achieved, using an apparatus whose dimensions are not too large.

The first object is achieved in accordance with the invention in that the mixture consists of from 50 to 95% by weight of an oligomeric urethane acrylate and from 5 to 50% by weight of one or more monomeric acrylates, the oligomeric urethane acrylate being a polyurethane acrylate having a number-averaged molecular weight in excess of 3000, of the following structural formula:

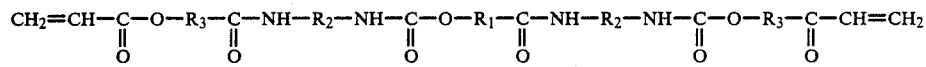

wherein $R_1$ is selected from the group formed by polyether chains and polyester chains having a number-aberaged molecular weight in excess of 2500, wherein $R_2$ is a bivalent radical of a diisocyanate, and wherein $R_3$ is a bivalent radical of a dihydric alcohol, the monomeric acrylates being selected from compounds having one acrylate-ester group per molecule.

Preferably, $R_1$ is selected from the group formed by:
$$-(CH_2-CH_2-O)_n-,$$

$$-(CH_2-\underset{CH_3}{CH}-O)_n-,$$

$$-(CH_2-CH_2-CH_2-CH_2-O)_n- \text{ and}$$

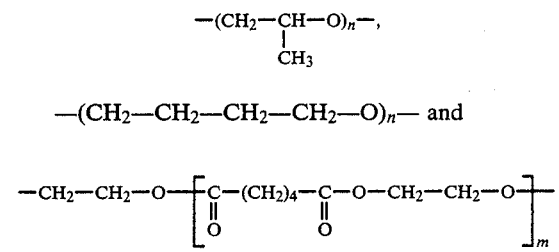

wherein the average value of n exceeds 90 and wherein the average value of m exceeds 30.

The susceptibility to crystallisation of the cured synthetic resin is very low if $R_1$ is a polyisopropylether chain.

In a suitable curable synthetic resin composition, $R_2$ is selected from the group formed by:

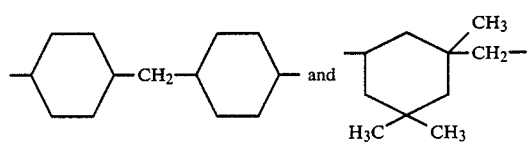

If the synthetic rubber is to have a low glass transition temperature and a high refractive index after the synthetic resin composition has cured, $R_2$ should be selected from the group formed by:

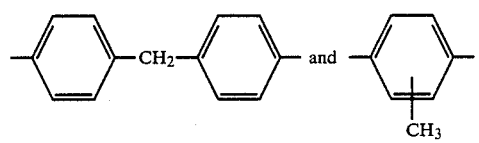

In a preferred curable synthetic resin composition, $R_3$ is selected from the group formed by:

—$(CH_2—CH_2—O)_p$— and

—$(CH_2—\underset{\underset{CH_3}{|}}{CH}—O)_p$— wherein p is at least 1.

In order to obtain a suitable viscosity and a high curing rate of the curable synthetic resin composition, one or several monomeric acrylates are applied. Preferably, they are selected from the group formed by 2-ethoxy-ethyl acrylate, 2'-ethoxy-2-ethoxy-ethyl acrylate, 3-methoxy-propyl acrylate, butyl acrylate, pentyl acrylate, hexyl acrylate, heptyl acrylate, octyl acrylate, nonyl acrylate, 2-ethyl-hexyl acrylate, 2-phenoxy-ethyl acrylate and 2'-(2-oxybenzophenone)-2-ethoxy-ethyl acrylate.

The curable synthetic resin composition can be made to cure by exposing it to electrons, for example, by using an Electrocurtain apparatus (a product of Energy Sciences Inc., Woburn, Mass.). However, it is also possible to cure the curable synthetic resin composition by exposing it to UV-light. In that case the curable synthetic resin composition should also contain 0.1 to 10% by weight of an initiator that can be activated by light. Preferably, this initiator is selected from the group formed by 2,2-dimethoxy-2-phenyl-acetophenone, 2,2-diethoxyacetophenone, 2,2-dimethyl-2-hydroxy-acetophenone and 2'-(2-oxybenzophenone)-2-ethoxy-ethyl acrylate. Thus, the last-mentioned compound can be used both as a diluent monomeric acrylate and as a photo-sensitive initiator.

To increase the curing rate of the curable synthetic resin it is effective if the curable synthetic resin composition contains of from 0 to 20% by weight of one or more monomeric polyfunctional acrylate compounds. Preferably, these monomeric polyfunctional acrylate compounds are selected from the group formed by hexane diol diacrylate, trimethylol propane triacrylate and tripropylene glycol diacrylate.

The object of providing an improved method is achieved in accordance with the invention in that a curable synthetic resin composition as described above is applied to the glass fibre, after which the curable synthetic resin composition is cured by exposing it to radiation for less than 0.5 seconds.

Figure 2:
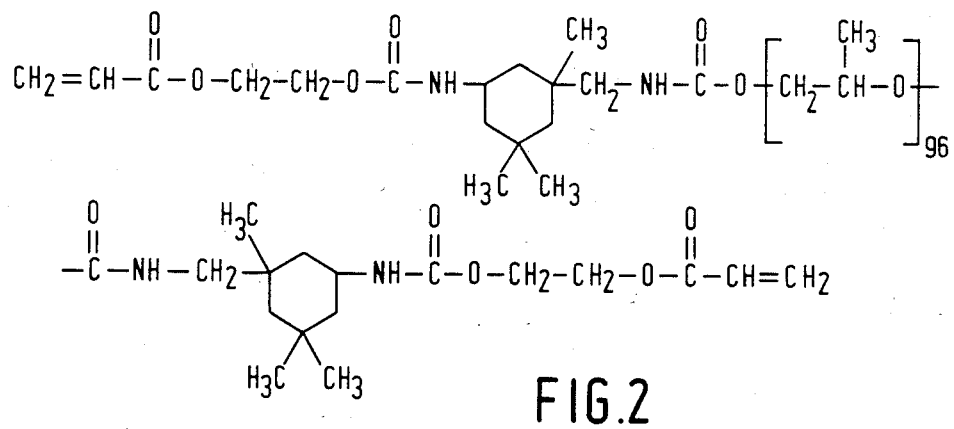
Figure 3:
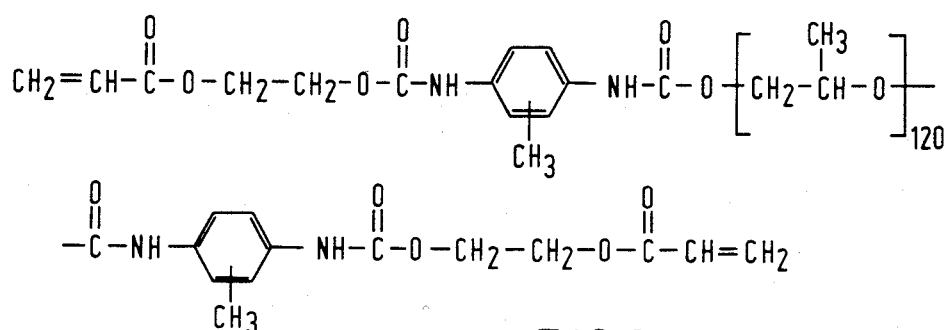
Figure 4:
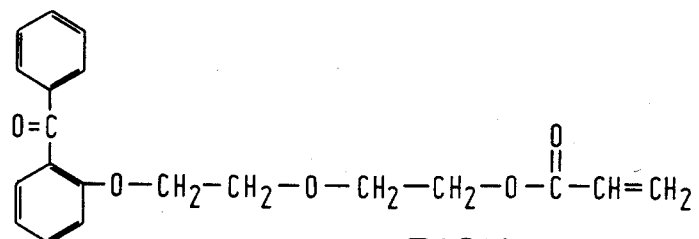

The invention will now be described in more detail with reference to embodiments of the invention, examples for comparison, and a drawing, in which FIG. 1 is a cross-sectional view of one embodiment of a glass fibre having a synthetic resin coating in accordance with the invention, FIG. 2 and FIG. 3 show different examples of polyether urethane acrylates for use in a curable synthetic resin composition employed for manufacturing a synthetic resin coating on an optical glass fibre in accordance with the invention, and FIG. 4 shows the structural formula of 2'-(2-oxybenzophenone)-2-ethoxy-ethyl acrylate.

EMBODIMENTS AND EXAMPLES FOR COMPARISON

In known manner a glass fibre is drawn from a preform. FIG. 1 is a cross-sectional view of a glass fibre comprising a core glass 1 and a cladding glass 2 having different refractive indices. The glass fibre shown in FIG. 1 is of circular cross-section, but may be of any other cross-section, for example elliptical or square. Immediately after the glass fibre has been formed, a layer of a curable synthetic resin composition is applied to said fibre and subsequently the synthetic resin composition is cured to form a layer of a synthetic rubber 3. The synthetic rubber coating and the method in accordance with the invention can also be applied to glass fibres produced by means of the double-crucible method and to graded index fibres instead of stepped index fibres.

A number of curable synthetic resin compositions was prepared as indicated in the Table below. The compositions 1 to 5 inclusive are compositions in accordance with the invention, the compositions VI and VII are compositions for comparison, not in accordance with the invention.

Component A is a polyether urethane acrylate as described above, wherein $R_1$ is a polyisopropyl ether group, wherein the average value of n is 96, wheren $R_2$ is the following vibalent radical:

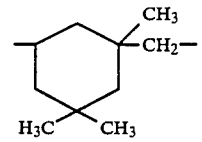

and wherein $R_3$ is the group —$(CH_2—CH_2—O)$—, see FIG. 2.

Component B is a polyether urethane acrylate as described above, wherein $R_1$ is a polyisopropyl ether group, wherein the average value of n is 120, wherein $R_2$ is the following bivalent radical:

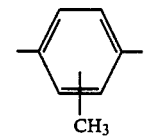

wherein the indication of the methyl group means that it can be connected to the phenyl ring at any position, and wherein $R_3$ is the group —$(CH_2—CH_2—O)$—, see FIG. 3.

The abbreviation EEEA in the Table stands for 2'-ethoxy-2-ethoxy-ethyl acrylate, PEA stands for 2-phenoxyethyl acrylate and TPGDA stands for tripropylene glycol diacrylate. The photosensitive initiator used is 2,2-dimethoxy-2-phenyl-acetophenone. The coating temperature is chosen so that the viscosity of the curable synthetic resin composition ranges from 2 to 3 Pa.s. To prevent the curable synthetic resin composition from curing prematurely, the coating temperature is preferably lower than 60° C.

TABLE

| Composition No. | According to the invention | | | | | Not according to the invention | |
|---|---|---|---|---|---|---|---|
| | 1 | 2 | 3 | 4 | 5 | VI | VII |
| Component A (% by weight) | 77 | 77 | 77 | — | — | 96 | — |
| Component B (% by weight) | — | — | — | 77 | 77 | — | 96 |
| EEEA (% by weight) | 19 | — | — | 19 | — | — | — |
| PEA (% by weight) | — | 19 | 9.5 | — | 19 | — | — |
| TPGDA (% by weight) | — | — | 9.5 | — | — | — | — |
| Initiator (% by weight) | 4 | 4 | 4 | 4 | 4 | 4 | 4 |
| Viscosity at 25° C. (Pa.s) | 3.8 | 7.6 | 8.0 | 8.7 | 17.7 | 38.5 | 75.0 |
| Coating temperature (°C.) | 31 | 43 | 42 | 53 | 59 | 66 | 86 |
| Curing time (s) | 0.12 | 0.50 | 0.06 | 0.50 | 0.60 | 0.12 | 0.50 |
| Glass transition temp. (°C.) | −56 | −56 | −52 | −62 | −59 | −52 | −62 |
| Refractive index ($n_D^{25}$) | 1.469 | 1.485 | 1.479 | 1.468 | 1.484 | 1.469 | 1.469 |
| Modulus of elasticity (MPa) | 2.5 | 3.4 | 1.0 | 1.3 | 1.5 | 2.5 | 1.4 |

Table 1 shows that the presence of low-viscosity monomeric acrylates hardly influence the glass transition temperature and the refractive index, whereas the viscosity is strongly dependent upon the presence of said acrylates. The compositions VI and VII can be applied to a glass fibre only at temperatures in excess of 60° C., which is undesirable. The refractive index depends upon the selection of the monomeric acrylate. The glass transition temperature depends particularly on the composition and the molecular weight of the polyether urethane acrylate.

A very fast curing synthetic resin composition can be obtained by means of the following formulation: 86% by weight of component A (FIG. 2), 10% by weight of EEEA, 2% by weight of 2,2-dimethoxy-2-phenylacetophenone and 2% by weight of 2'-(2-oxybenzophenone)-2-ethoxy-ethyl acrylate (FIG. 4). The viscosity of this formulation is 10 Pa.s at 25° C. and 3.1 Pa.s at 45° C. The curable composition is applied to a glass fibre at 45° C. A suitable coating thickness on a glass fibre having a diameter of 125 μm is, for example, 30 μm. The curable synthetic resin composition is cured by exposure to radiation for 0.06 s using a medium-pressure mercury vapour lamp at a distance of 20 cm. The glass transition temperature of the synthetic rubber thus formed is −50° C.

We claim:

1. An optical glass fibre having a synthetic resin coating comprising a synthetic rubber formed from a curable synthetic resin composition which consists of a mixture of from 50 to 95% by weight of an oligomer urethane acrylate, from 5 to 50% by weight of at least one monomeric acrylate, from 0 to 20% by weight of one or more monomeric polyfunctional acrylate compounds and from 0 to 10% by weight of an initiator that can be activated by light, the oligomeric urethane acrylate being a polyurethane acrylate having a number-averaged molecular weight in excess of 3000 with the following structural formula:

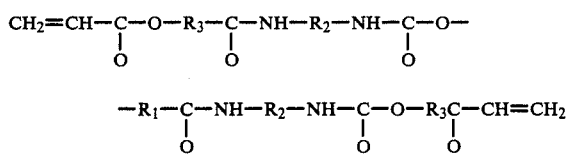

wherein $R_1$ is a bivalent group selected from the group consisting of polyether chains and polyester chains having a number-averaged molecular weight in excess of 2500, wherein $R_2$ is a bivalent radical of a diisocyanate and wherein $R_3$ is a bivalent radical of an dihydric alcohol, the monomeric acrylates having a single acrylate-ester group per molecule.

2. An optical glass fibre as claimed in claim 1, wherein $R_1$ is a radical selected from the group consisting of:

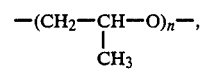

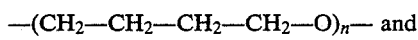

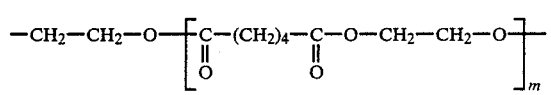

wherein the average value of n exceeds 90 and wherein the average value of m exceeds 30.

3. An optical glass fibre as claimed in claim 1, wherein $R_2$ is a radical selected from the group consisting of:

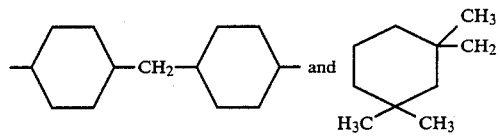

4. An optical glass fibre as claimed in claim 1, wherein $R_2$ is a radical selected from the group consisting of:

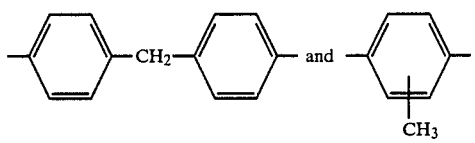

5. An optical glass fibre as claimed in claim 1, wherein $R_3$ is a radical selected from the group consisting of:

—$(CH_2—CH_2—O)_p$— and

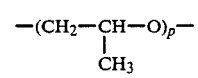

wherein p is at least 1.

6. An optical glass fibre as claimed in claim 2, wherein said monomeric acrylates are selected from the group consisting of 2-ethoxyethyl acrylate, 2'-ethoxy-2-ethoxy-ethyl acrylate, 3-methoxy-propyl acrylate, butyl acrylate, pentyl acrylate, hexyl acrylate, heptyl acrylate, octyl acrylate, nonyl acrylate, 2-ethyl-hexyl acrylate, 2-phenoxy-ethyl acrylate and 2'-(2-oxybenzophenone)-2-ethoxy-ethyl acrylate.

7. An optical glass fibre as claimed in claim 1, wherein said curable synthetic resin composition contains 0.1 to 10% by weight of an initiator that can be activated by light.

8. An optical glass fibre as claimed in claim 7, wherein said initiator that can be activated by light is selected from the group consisting of 2,2-dimethoxy-2-phenyl-acetophenone, 2,2-diethoxy-acetophenone, 2,2-dimethyl-2-hydroxy-acetophenone and 2'-(2-oxybenzophenone)-2-ethoxy-ethyl acrylate.

9. An optical glass fibre as claimed in claim 1, wherein characterized in that said monomeric polyfunctional acrylate compounds are selected from the group consisting of hexane diol diacrylate, trimethylol propane triacrylate and tripropylene glycol diacrylate.

* * * * *